N. M. ROBINSON.
VEHICLE WHEEL.
APPLICATION FILED JUNE 21, 1920.

1,422,479.

Patented July 11, 1922.

Witness:
R. E. Hamilton

INVENTOR
Neal Moore Robinson
BY
Warren W. House.
His ATTORNEY

UNITED STATES PATENT OFFICE.

NEAL MOORE ROBINSON, OF KANSAS CITY, KANSAS.

VEHICLE WHEEL.

1,422,479.　　　Specification of Letters Patent.　　Patented July 11, 1922.

Application filed June 21, 1920. Serial No. 390,493.

*To all whom it may concern:*

Be it known that I, NEAL MOORE ROBINSON, a citizen of the United States, residing at Kansas City, in the county of Wyandotte and State of Kansas, have invented a certain new and useful Improvement in Vehicle Wheels, of which the following is a specification.

My invention relates to improvements in vehicle wheels.

The object of my invention is to provide a novel wheel which may be used in lieu of a wheel with a pneumatic tire, which is strong and durable, not liable to get out of order, which is simple in construction and cheap to manufacture, which eliminates punctures and which is easy riding and efficient.

The novel features of my invention are hereinafter fully described and claimed.

In the accompanying drawing, which illustrates the preferred embodiment of my invention, Fig. 1 is a side view, partly in elevation and partly in vertical section of my improved wheel.

Similar reference characters designate similar parts in the different views.

Figure 1:
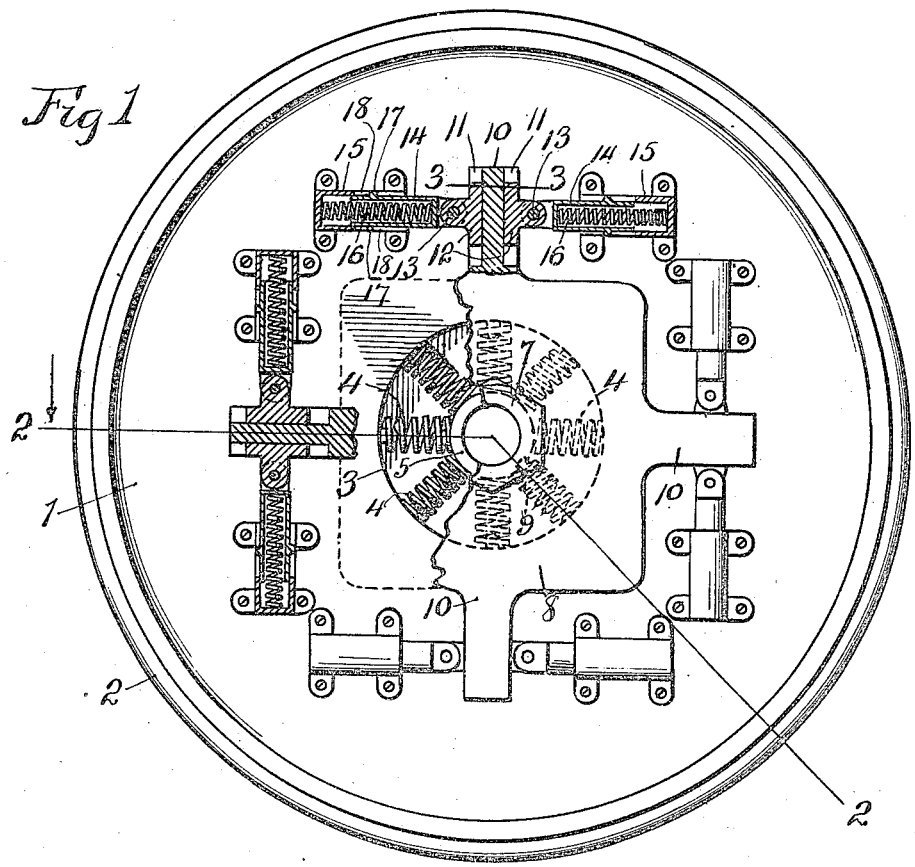
Figure 2:
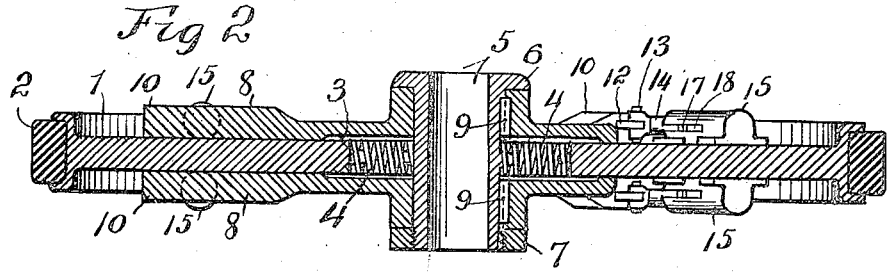
Fig. 2 is a sectional view on the line 2—2 of Fig. 1.
Figure 3:
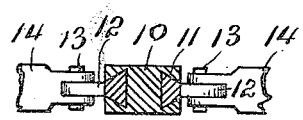
Fig. 3 is a cross section on the line 3—3 of Fig. 1.

1 designates the body of a wheel having mounted on its periphery an ordinary solid rubber tire 2.

In the center of the body is a large opening 3, in which are located radially disposed coil springs 4 which bear at their outer ends against the body 1 and which bear at their inner ends against the periphery of a central hub 5 which is adapted to be mounted upon an axle or a spindle. One end of the hub 5 is provided with a peripheral flange 6. The other end is screw-threaded and has mounted on it a nut 7.

Mounted on the hub at opposite sides respectively of the body 1 are two driving members 8, which close the opening 3 and which are secured from rotation on the hub 5 in any suitable manner, as by keys 9.

The hub 5 is movable in all directions in a vertical plane with respect to the body 1 in any operative position of the latter as are the driving members 8. The springs 4 are supported by the body and support the hub 5.

Each driving member 8 has radial arms 10, each having a longitudinal dove-tail groove 11, in which is slidably fitted a member 12. Secured respectively by transverse pins 13 to the slidable members 12 are tubular bearing members 14, each of which is closed at its inner end and is slidably fitted in a tubular bearing member 15, which is attached to the adjacent side of the body 1, and which is closed at its outer end. Two bearing members 15 are disposed respectively at opposite sides of the adjacent arm 10. The members 15 are disposed so that the slidable members 14 move transversely to the path of movement of the adjacent slidable members 12.

Mounted in each member 14 is a coil spring 16 which has its inner end bearing against the closed end of the member 14 and which has its outer end bearing against the closed outer end of the adjacent member 15. Each pair of springs 16 serve to resist rotation in either direction relatively to the body 1 of the adjacent driving member 8.

For holding each member 14 from turning in the member 15, each member 14 is provided on its outer side with two oppositely disposed lugs 17 respectively slidably fitted in longitudinal slots 18 extending from the inner end of each member 15 in opposite sides thereof.

With the parts as shown in Fig. 1, when the hub 5 and members 8 move downwardly, the upper and lower arms 10 will slide downwardly between the members 12 which are engaged therewith, and the members 14 which are disposed vertically will slide downwardly in the members 15 with which they are engaged. With the parts positioned at an angle of 45 degrees from that shown in Fig. 1, all of the arms 10 will slidably engage the members 12, and all of the members 14 will slide in the members 15.

When the hub 5 is revolved, the body 1 will be revolved in a like direction through the intermediacy of the driving members 8 and those members 12, 14, 15 and springs 16 which are at the forward sides of the arms 10. When the hub is turned in the opposite direction, the body 1 will be rotated in a like direction by the members 12, 14, 15, and springs 16 which are at the opposite sides of the arms 10.

I do not limit my invention to the structure shown and described, as many modifications, within the scope of the appended claim, may be made without departing from the spirit of my invention.

What I claim is:—

In a vehicle wheel, a body adapted to support a tire, a radially movable hub, resilient means supported by the body and supporting the hub, a driving member mounted on and rotatable with the hub and provided with radial arms, each of which is provided with radial dove-tail grooves on its opposite sides respectively, members respectively slidably fitted in said grooves, bearing members respectively fastened to said slidable members, bearing members secured to said body and respectively slidably engaging the first named bearing members, and compression springs interposed between said pairs of bearing members respectively, the bearing members which are attached to said slidable members being movable tangentially, substantially as set forth.

In testimony whereof I have signed my name to this specification.

NEAL MOORE ROBINSON.